United States Patent
Aoki et al.

(10) Patent No.: US 11,242,671 B2
(45) Date of Patent: Feb. 8, 2022

(54) HYDRAULIC CIRCUIT OF CONSTRUCTION MACHINE

(71) Applicants: KAWASAKI JUKOGYO KABUSHIKI KAISHA, Kobe (JP); CATERPILLAR SARL, Geneva (CH)

(72) Inventors: Seiji Aoki, Kobe (JP); Yoshiyuki Tode, Kakogawa (JP); Masahiro Ohira, Kobe (JP); Hideki Nakajima, Akashi (JP)

(73) Assignees: KAWASAKI JUKOGYO KABUSHIKI KAISHA, Kobe (JP); CATERPILLAR SARL, Geneva (CH)

( * ) Notice: Subject to any disclaimer, the term of this patent is extended or adjusted under 35 U.S.C. 154(b) by 0 days.

(21) Appl. No.: 17/262,780

(22) PCT Filed: Aug. 1, 2019

(86) PCT No.: PCT/JP2019/030114
§ 371 (c)(1),
(2) Date: Jan. 25, 2021

(87) PCT Pub. No.: WO2020/031817
PCT Pub. Date: Feb. 13, 2020

(65) Prior Publication Data
US 2021/0270015 A1   Sep. 2, 2021

(30) Foreign Application Priority Data
Aug. 10, 2018 (JP) .............................. JP2018-151070

(51) Int. Cl.
*E02F 9/22* (2006.01)
(52) U.S. Cl.
CPC .......... *E02F 9/2225* (2013.01); *E02F 9/2267* (2013.01); *E02F 9/2278* (2013.01); *F15B 2211/30555* (2013.01)

(58) Field of Classification Search
CPC ....... E02F 9/2225; E02F 9/225; E02F 9/2253; F15B 2211/30555
See application file for complete search history.

(56) References Cited

U.S. PATENT DOCUMENTS

| 5,259,192 A | * | 11/1993 | Karakama | E02F 9/2285 60/422 |
|---|---|---|---|---|
| 5,347,811 A | * | 9/1994 | Hasegawa | E02F 9/2225 60/426 |

(Continued)

FOREIGN PATENT DOCUMENTS

| JP | H04-224470 A | 8/1992 |
|---|---|---|
| JP | H04-261923 A | 9/1992 |
| JP | 2015-064024 A | 4/2015 |

*Primary Examiner* — Thomas E Lazo
(74) *Attorney, Agent, or Firm* — Oliff PLC (57) ABSTRACT

Each of left and right direction switching valves includes: a pump port connected to a pump; a first compensation port connected to an upstream side of a corresponding pressure compensation valve; a second compensation port connected to a downstream side of the corresponding pressure compensation valve; a pair of supply/discharge ports connected to a corresponding travel motor; and a communication port. The communication ports of the left and right direction switching valves are connected by a communication line. When a spool shifts from a neutral position by the travel operation device, the pump port communicates with the first compensation port and the second compensation port communicates with one of the supply/discharge ports and the communication port. Each direction switching valve is configured wherein a degree of communication between the second compensation port and communication port increases in a shifting amount of the spool from the neutral position.

6 Claims, 3 Drawing Sheets

(56) References Cited

U.S. PATENT DOCUMENTS

| | | | | |
|---|---|---|---|---|
| 5,857,330 A * | 1/1999 | Ishizaki | ............... | F16H 61/40 60/426 |
| 5,950,429 A * | 9/1999 | Hamkins | ............ | F15B 11/162 60/422 |
| 6,318,079 B1 * | 11/2001 | Barber | ............... | F15B 11/163 60/422 |
| 6,895,852 B2 * | 5/2005 | Pieper | ............... | E02F 9/2225 60/422 |
| 7,487,707 B2 * | 2/2009 | Pfaff | ................ | F15B 11/003 91/437 |
| 8,020,583 B2 * | 9/2011 | Christensen | ....... | F15B 13/0417 137/493 |
| 8,701,399 B2 * | 4/2014 | Horii | ................ | E02F 9/2292 60/421 |

* cited by examiner

HYDRAULIC CIRCUIT OF CONSTRUCTION MACHINE

TECHNICAL FIELD

The present invention relates to a hydraulic circuit installed in a construction machine.

BACKGROUND ART

Figure 3:
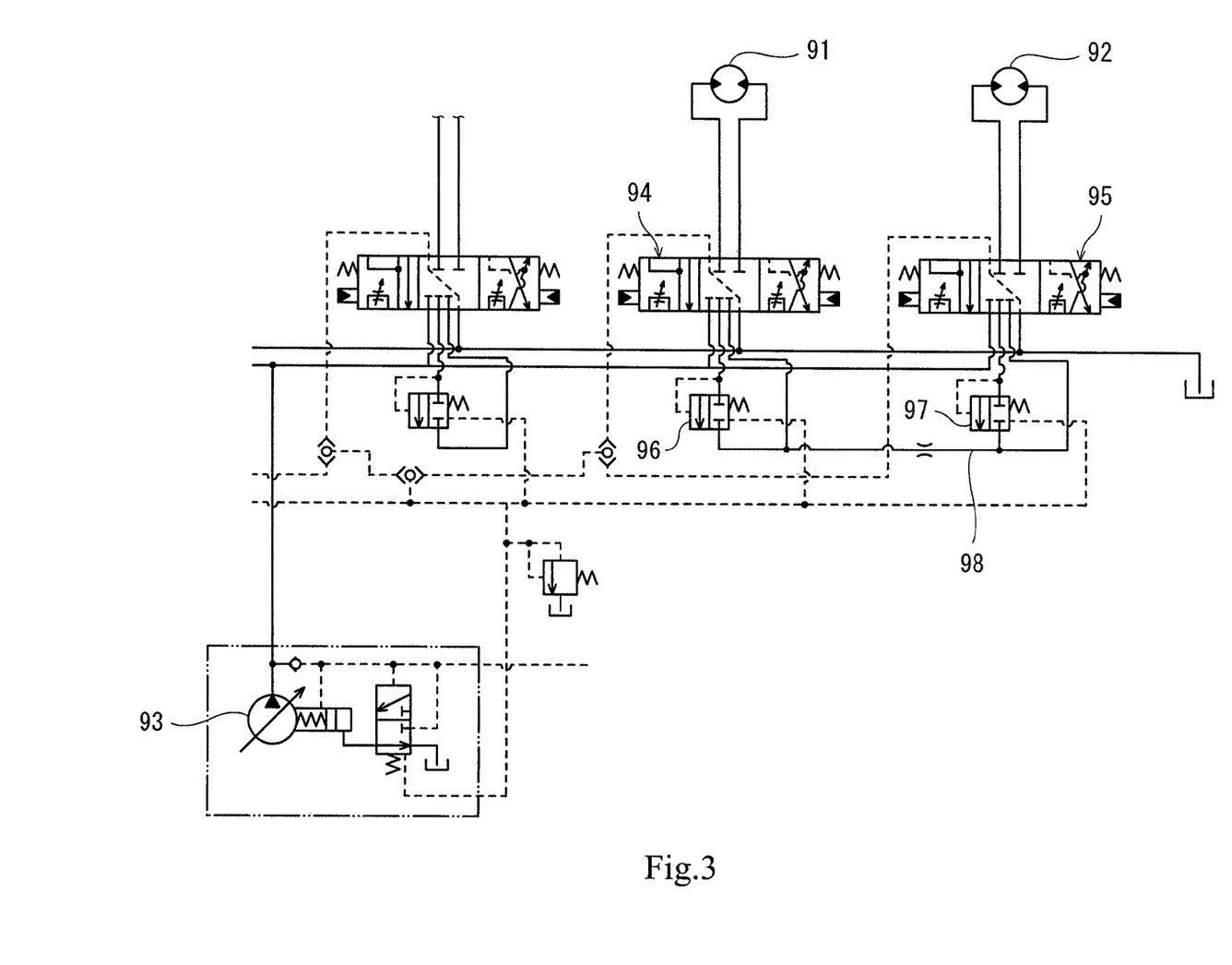
FIG. 3 is a circuit diagram showing a conventional example of a hydraulic circuit.

Generally speaking, left and right hydraulic motors are used as travel driving sources of a construction machine (see Patent Literature 1, for example). It should be noted that the terms "left" and "right" herein mean "left" and "right" with respect to the forward travel direction of the construction machine. With reference to FIG. 3, a direction switching valve 94 and a pressure compensation valve 96 are provided between a travel motor 91 and a pump 93, and a direction switching valve 95 and a pressure compensation valve 97 are provided between a travel motor 92 and the pump 93. An operator's seat is provided with left and right travel operation devices for operating the left and right direction switching valves 94 and 95, respectively. When the operator operates the travel operation devices, pressurized oil delivered from the pump 93 is supplied to the travel motors 91 and 92 via the direction switching valves 94 and 95 and the pressure compensation valves 96 and 97. The downstream sides of the respective left and right pressure compensation valve 96 and 97 always communicate with each other via a communication line 98. Accordingly, when both the travel operation devices are operated in the same direction, the load pressures or rotation speeds of both the travel motors 91 and 92 are leveled out, and consequently, the straight travel performance of the construction machine is improved.

CITATION LIST

Patent Literature

PTL 1: Japanese Laid-Open Patent Application Publication No. H04-224470

SUMMARY OF INVENTION

Technical Problem

In the description herein, a term "turning travel" refers not to slewing of an upper body frame, to which the operator's seat and work equipment are mounted, but to turning travel of a lower traveling frame, to which the travel motors are mounted. In the description herein, turning travel of the lower traveling frame is seen as an antonym of straight travel of the lower traveling frame when the lower traveling frame travels. Turning travel of a construction machine can be categorized into multiple types, such as gradual turning and pivot turning. Pivot turning is to turn the entire construction machine by operating only one of the left and right travel operation devices, or by operating both the left and right travel operation devices in the opposite directions to each other, thereby performing turning travel. It should be noted that there is also super pivot turning, in which both the travel operation devices are fully operated in the opposite directions to each other. In gradual turning, both the travel operation devices are operated in the same direction but by different operating amounts, such that the construction machine travels forward or backward in a manner to draw an arc, thereby changing the travel path. In the case of performing straight travel, both the travel operation devices are operated in the same direction by the same operating amount.

In Patent Literature 1, operations for straight travel are referred to as "operations in the same direction". That is, Patent Literature 1 does not consider differentiation between operations for straight travel and operations for gradual turning (in which both the travel operation devices are operated in the same direction but by different operating amounts). When the operator performs the operations for gradual turning, although one of the travel motors 91 and 92 is to be slowed down, the hydraulic oil flows into the one travel motor 91 or 92 via the communication line 98. Consequently, the construction machine acts to travel straight. Thus, as a result of improving the straight travel performance, the turning travel performance is impaired.

In view of the above, an object of the present invention is to secure both straight travel performance and turning travel performance of a construction machine.

Solution to Problem

A hydraulic circuit of a construction machine according to the present invention includes: a pump; left and right travel motors provided as a left travel motor and a right travel motor of the construction machine; left and right pressure compensation valves corresponding to the respective left and right travel motors; left and right travel operation devices corresponding to the respective left and right travel motors; and left and right direction switching valves corresponding to the respective left and right travel motors, the respective left and right pressure compensation valves, and the respective left and right travel operation devices, the left and right direction switching valves each changing a position of a spool thereof in accordance with an operating amount of the corresponding travel operation device. Each direction switching valve includes: a pump port connected to the pump; a first compensation port connected to an upstream side of the corresponding pressure compensation valve; a second compensation port connected to a downstream side of the corresponding pressure compensation valve; and a pair of supply/discharge ports connected to the corresponding travel motor. The hydraulic circuit further comprises a communication line that allows the second compensation ports of the respective left and right direction switching valves to communicate with each other when the left and right travel operation devices are operated. A degree of communication of the communication line is changed in accordance with operating amounts of the respective left and right travel operation devices.

According to the above configuration, when an operator operates the left and right travel operation devices, the fluidic connection between the left and right travel motors is adjusted in accordance with the operating amounts of the respective travel operation devices, and thereby not only straight travel performance but also turning travel performance (turning performance) can be improved.

Alternatively, a hydraulic circuit of a construction machine according to the present invention may include: a pump; left and right travel motors provided as a left travel motor and a right travel motor of the construction machine; left and right pressure compensation valves corresponding to the respective left and right travel motors; left and right travel operation devices corresponding to the respective left and right travel motors; and left and right direction switching valves corresponding to the respective left and right travel motors, the respective left and right pressure compensation valves, and the respective left and right travel operation devices, the left and right direction switching valves each changing a position of a spool thereof in accordance with an operating amount of the corresponding travel operation device. Each direction switching valve may include: a pump port connected to the pump; a first compensation port connected to an upstream side of the corresponding pressure compensation valve; a second compensation port connected to a downstream side of the corresponding pressure compensation valve; a pair of supply/discharge ports connected to the corresponding travel motor; and a communication port. The communication ports of the respective left and right direction switching valves may be connected to each other via a communication line. When the spool of each direction switching valve shifts from a neutral position as a result of the corresponding travel operation device being operated, the pump port may communicate with the first compensation port and the second compensation port communicates with one of the supply/discharge ports and the communication port. Each direction switching valve may be configured such that a degree of communication between the second compensation port and the communication port increases in accordance with increase in a shifting amount of the spool from the neutral position.

According to the above configuration, in a case where the operator operates the left and right travel operation devices by the same operation amount to perform straight travel, pressurized oil from the pump is supplied to each of the left and right travel motors via the pump port, the first compensation port, the pressure compensation valve, the second compensation port, and one of the supply/discharge ports. Also, the second compensation port communicates with the communication port. Accordingly, even if a load pressure difference occurs between the left and right travel motors, the downstream sides of the respective left and right pressure compensation valves communicate with each other via the communication line, and thereby the load pressure difference is corrected. Thus, during a straight travel operation of the construction machine, even if a load pressure difference occurs between the left and right travel motors, the load pressure difference can be corrected sufficiently, which makes it possible to obtain sufficient straight travel performance.

Also in a case where the operator operates the left and right travel operation devices by different operating amounts, respectively, to perform turning travel, similar to the case of straight travel, the downstream sides of the respective left and right pressure compensation valves communicate with each other via the communication line. However, in the direction switching valve on the smaller operating amount side, the shifting amount of the spool is smaller, and the degree of communication between the second compensation port and the communication port is relatively small. Therefore, the load pressure difference is not easily corrected compared to the case of straight travel. Thus, during a turning travel operation of the construction machine, when a load pressure difference occurs between the left and right travel motors, the correction of the load pressure difference can be refrained from being performed, which makes it possible to obtain sufficient turning travel performance.

The hydraulic circuit of a construction machine according to the present invention may be configured such that the communication port of each direction switching valve is blocked when the corresponding travel operation device is in a non-operated state and the spool is at the neutral position.

According to the above configuration, in a case where the operator is operating only one of the travel operation devices to perform pivot turning, the communication port is blocked in the direction switching valve on the non-operated side. In this manner, the downstream sides of the respective pressure compensation valves can be prevented from always communicating with each other, and the hydraulic oil does not flow from the operated side to the non-operated side. This makes it possible to suppress the occurrence of an ineffective flow.

Advantageous Effects of Invention

The present invention makes it possible to secure both straight travel performance and turning travel performance of a construction machine.

DESCRIPTION OF EMBODIMENTS

Figure 1:
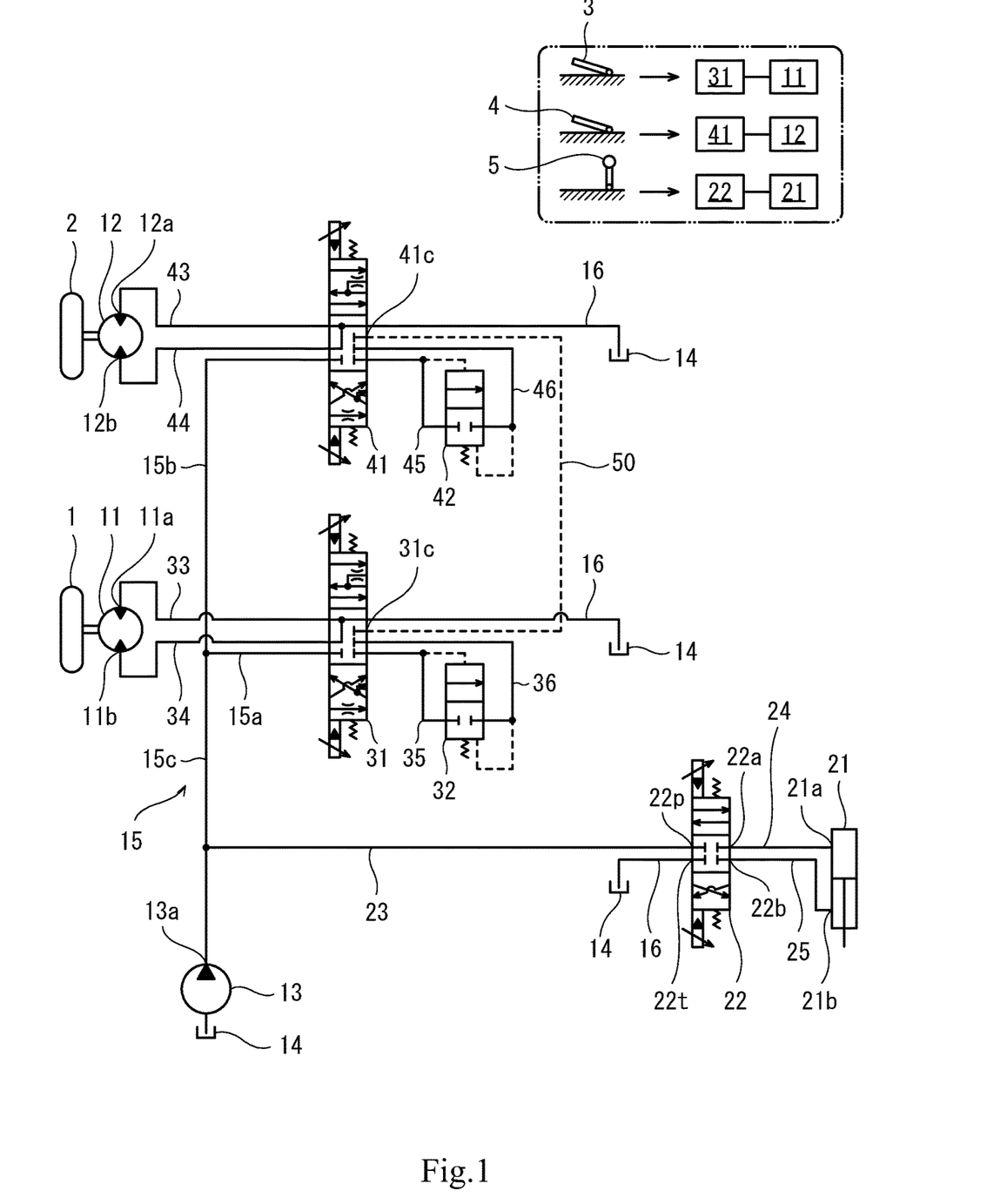
FIG. 1 is a circuit diagram showing a hydraulic circuit according to an embodiment.

FIG. 1 is a circuit diagram showing a hydraulic circuit 10 according to an embodiment. The hydraulic circuit 10 shown in FIG. 1 is installed in a construction machine (in particular, a small-sized construction machine). Although not illustrated in detail, the construction machine includes work equipment mounted to its body frame, and the work equipment is operated to perform required work. Examples of such a construction machine include an excavator and a crane truck. The construction machine is of a self-propelled type, and one example of the construction machine is a crawler vehicle including left and right crawlers. The left crawler includes a left drive sprocket 1, which drives left crawler shoes to rotate. The right crawler includes a right drive sprocket 2, which drives right crawler shoes to rotate. However, the construction machine need not be a crawler vehicle, but may be a wheeled vehicle including left and right wheels instead of the crawlers.

The construction machine includes an operator's seat that is provided with left and right travel operation devices 3 and 4 and at least one work equipment operation device 5. Each of the travel operation devices 3 and 4 is not limited to a particular type of operation device, but may be a lever-type or pedal-type operation device, or may be an operation device including both a lever and a pedal. The left travel operation device 3 is used for operating the left crawler, and the right travel operation device 4 is used for operating the right crawler. The left travel operation device 3 can be operated from a non-operated neutral position in two operating directions, i.e., a first operating direction and a second operating direction. The left crawler is in a stopped state when the left travel operation device 3 is in the neutral position. When the left travel operation device 3 is operated from the neutral position in the first operating direction, the left crawler rotates in a forward travel direction (counterclockwise in a left side view). When the left travel operation device 3 is operated from the neutral position in the second operating direction, the left crawler rotates in a backward travel direction (clockwise in the left side view). The rotation speed of the left crawler is adjusted in accordance with the operating amount of the left travel operation device 3.

The same relationship applies between the right travel operation device 4 and the right crawler.

The hydraulic circuit 10 includes: left and right travel motors 11 and 12 provided as a left travel motor and a right travel motor of the construction machine; a pump 13; a tank 14; a work equipment actuator 21; a work equipment direction switching valve 22; left and right direction switching valves 31 and 41, and left and right pressure compensation valves 32 and 42. It should be noted that the terms "left" and "right" herein mean "left" and "right" with respect to the forward travel direction of the construction machine.

The left travel motor 11 includes a pair of supply/discharge ports 11a and 11b, and drives the left drive sprocket 1 to rotate in the forward travel direction or the backward travel direction. The right travel motor 12 includes a pair of supply/discharge ports 12a and 12b, and drives the right drive sprocket 2 to rotate in the forward travel direction or the backward travel direction. The pump 13 sucks hydraulic oil stored in the tank 14, and delivers the pressurized oil from a delivery port 13a. The pump 13 is the source of supply of the pressurized oil to the left and right travel motors 11 and 12. The pressurized oil delivered from the pump 13 is supplied to the travel motors 11 and 12 via a pump line 15 connected to the delivery port 13a.

As one example, the pump 13 may be the source of supply of the pressurized oil to the work equipment actuator 21. A second pump line 23 is branched off from the pump line 15, and connected to a pump port 22p of the work equipment direction switching valve 22. A tank line 16 is connected to a tank port 22t of the valve 22. A pair of supply/discharge ports 22a and 22b is connected to supply/discharge ports 21a and 21b of the work equipment actuator 21 via a pair of supply/discharge lines 24 and 25. The work equipment direction switching valve 22 is operated by the work equipment operation device 5, and thereby supply and discharge of the pressurized oil to and from the work equipment actuator 21 are controlled.

The left direction switching valve 31 corresponds to the left travel motor 11, the left pressure compensation valve 32, and the left travel operation device 3. The right direction switching valve 41 corresponds to the right travel motor 12, the right pressure compensation valve 42, and the right travel operation device 4. The left direction switching valve 31 is configured to change the position of the spool thereof in accordance with the operating direction and operating amount of the left travel operation device 3. The same relationship applies between the right travel operation device 4 and the position of the spool of the right direction switching valve 41.

Figure 2:
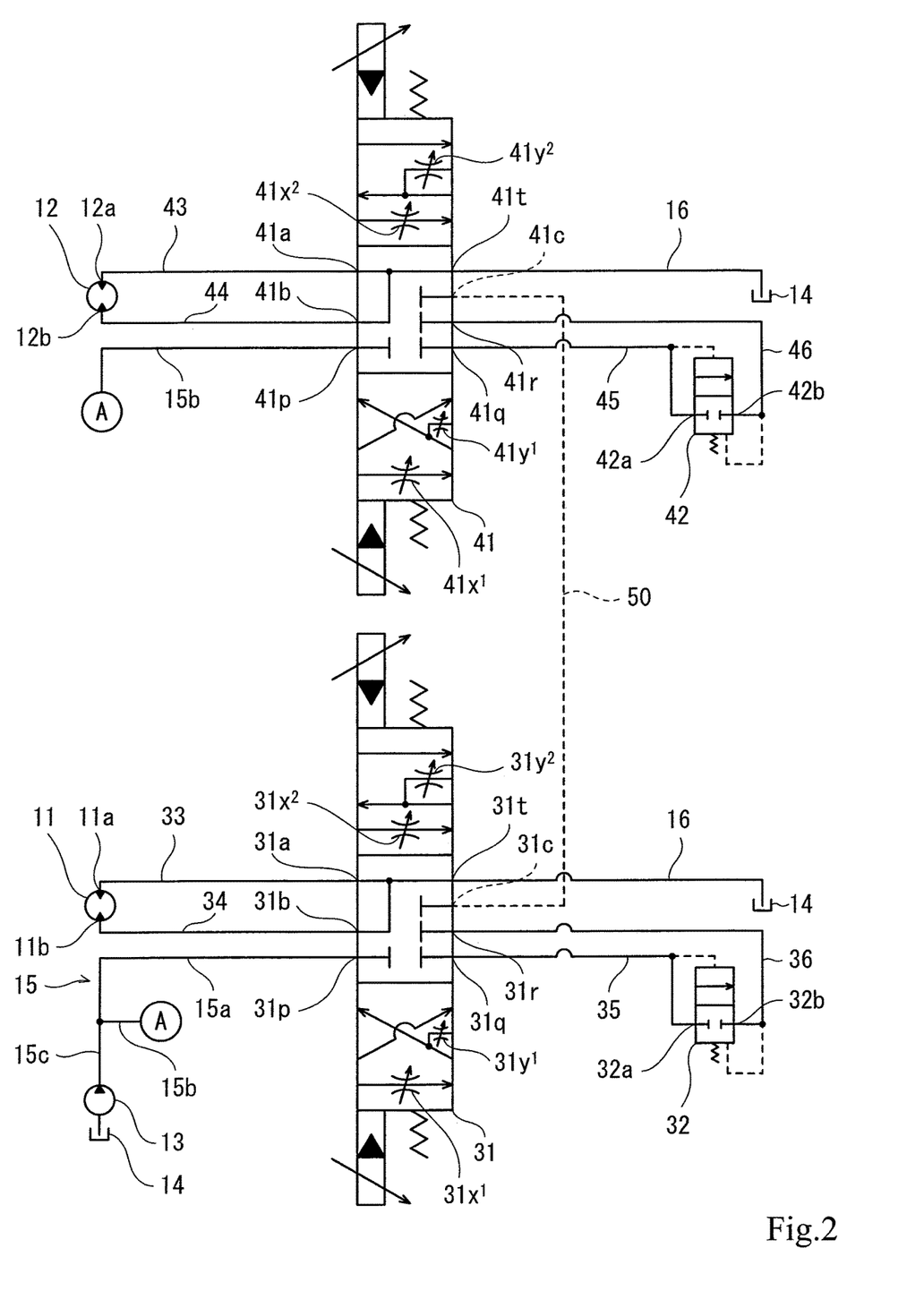
FIG. 2 shows left and right direction switching valves.

With reference to FIG. 2, the left direction switching valve 31 includes a pump port 31p, a tank port 31t, a first compensation port 31q, a second compensation port 31r, a pair of supply/discharge ports 31a and 31b, and a communication port 31c. Similarly, the right direction switching valve 41 includes a pump port 41p, a tank port 41t, a first compensation port 41q, a second compensation port 41r, a pair of supply/discharge ports 41a and 41b, and a communication port 41c.

Each of the pump ports 31p and 41p is connected to the delivery port 13a of the pump 13 via the pump line 15. The pump line 15 includes: a single-line shared portion 15c connected to the delivery port 13a; and two branch portions 15a and 15b, which are branched off from the shared portion 15c and are connected to the pump ports 31p and 41p, respectively. Each of the tank ports 31t and 41t is connected to the tank 14 via the tank line 16. The communication port 31c of the left direction switching valve 31 is connected to the communication port 41c of the right direction switching valve 41 via a communication line 50.

The supply/discharge port 31a of the left direction switching valve 31 is connected to a supply/discharge port 11a of the left travel motor 11 via a supply/discharge line 33, and the supply/discharge port 31b of the left direction switching valve 31 is connected to a supply/discharge port 11b of the left travel motor 11 via a supply/discharge line 34. The first compensation port 31q is connected to an upstream port 32a of the left pressure compensation valve 32 via a primary compensation line 35. A downstream port 32b of the left pressure compensation valve 32 is connected to the second compensation port 31r via a secondary compensation line 36. Connections are made in the same manner among the compensation ports 41q and 41r, the right pressure compensation valve 42, the supply/discharge ports 41a and 41b, and the right travel motor 12.

When the left travel operation device 3 is in a non-operated state and is in the neutral position, the spool of the left direction switching valve 31 is at its neutral position (see the middle function in FIG. 1 and FIG. 2). At the time, the pump port 31p, the first compensation port 31q, the second compensation port 31r, and the communication port 31c are blocked, and the supply/discharge ports 31a and 31b communicate with the tank port 31t.

When the left travel operation device 3 is operated from the neutral position in the first operating direction, the spool of the left direction switching valve 31 shifts from the neutral position in a first shifting direction (see the upper function in FIG. 1 and FIG. 2). At the time, the pump port 31p communicates with the first compensation port 31q; the second compensation port 31r communicates with the supply/discharge port 31b and the communication port 31c; and the supply/discharge port 31a communicates with the tank port 31t.

When the left travel operation device 3 is operated from the neutral position in the second operating direction, the spool of the left direction switching valve 31 shifts from the neutral position in a second shifting direction opposite to the first shifting direction (see the lower function in FIG. 1 and FIG. 2). At the time, the pump port 31p communicates with the first compensation port 31q; the second compensation port 31r communicates with the supply/discharge port 31a and the communication port 31c; and the supply/discharge port 31b communicates with the tank port 31t.

When the spool of the left direction switching valve 31 shifts from the neutral position, the pump port 31p communicates with the first compensation port 31q regardless of the shifting direction. The degree of communication between the ports 31p and 31q increases in accordance with increase in the operating amount of the left travel operation device 3 and in accordance with increase in the shifting amount of the spool from the neutral position. In this respect, the upper and lower functions of the left direction switching valve 31, which are shown in FIG. 2, are provided with arrow symbols indicating that the ports 31p and 31q communicate with each other, and also, symbols representing variable restrictors 31x1 and 31x2 are added to these arrow symbols.

When the spool of the left direction switching valve 31 shifts from the neutral position, the second compensation port 31r communicates with the communication port 31c regardless of the shifting direction. The degree of communication between the ports 31r and 31c increases in accordance with increase in the operating amount of the left travel operation device 3 and in accordance with increase in the shifting amount of the spool from the neutral position. In this respect, the upper and lower functions of the left direction switching valve 31, which are shown in FIG. 2, are provided with arrow symbols indicating that the ports 31r and 31c communicate with each other, and also, symbols representing variable restrictors 31y1 and 31y2 are added to these arrow symbols.

The same relationship applies between the spool position of the right direction switching valve 41 and the communication state of the ports. Reference signs 41x1 and 41x2 denote variable restrictors indicating that when the spool of the right direction switching valve 41 shifts from the neutral position, the degree of communication between the pump port 41p and the first compensation port 41q changes in accordance with the shifting amount of the spool. Reference signs 41y1 and 41y2 denote variable restrictors indicating that when the spool of the right direction switching valve 41 shifts from the neutral position, the degree of communication between the second compensation port 41r and the communication port 41c changes in accordance with the shifting amount of the spool.

Hereinafter, functions of the hydraulic circuit 10 configured as above are described.

In the case of performing forward straight travel, the operator is required to operate the left and right travel operation devices 3 and 4 in the first operating direction by the same operating amount. In the case of performing backward straight travel, the operator is required to operate the left and right travel operation devices 3 and 4 in the second operating direction by the same operating amount. Usually, in the case of performing straight travel, the operator fully operates the left and right travel operation devices 3 and 4. In response thereto, the spool of the left direction switching valve 31 shifts greatly from the neutral position in the first or second shifting direction, and the degree of communication between the ports 31p and 31q is maximized. The right direction switching valve 41 acts in the same manner. Accordingly, roughly equal high flow rates can be supplied to the left and right travel motors 11 and 12, respectively, and thereby relatively high speed straight travel of the construction machine can be realized.

Further, the downstream side of the left pressure compensation valve 32 communicates with the downstream side of the right pressure compensation valve 42 via the second compensation port 31r, the communication port 31c, the communication line 50, the communication port 41c, and the second compensation port 41r. In the left direction switching valve 31, the degree of communication between the second compensation port 31r and the communication port 31c is maximized. Also in the right direction switching valve 41, the degree of communication between the second compensation port 41r and the communication port 41c is maximized. Therefore, even if a load pressure difference occurs between the left and right travel motors 11 and 12, the load pressure difference can be corrected. Thus, the load pressures of the travel motors 11 and 12 are leveled out, and consequently, the rotation speeds of the travel motors 11 and 12 are leveled out, which makes it possible to keep the straightness of the travel of the construction machine.

In the case of performing a left gradual turn during forward travel, the operator operates the left and right travel operation devices 3 and 4 in the first operating direction. At the time, the right travel operation device 4 is fully operated, whereas the left travel operation device 3 is not fully operated, but operated by an intermediate operating amount in accordance with the radius of desired turning travel. In this case, similar to the above-described case of straight travel, the degree of communication is maximized in the right direction switching valve 41. Meanwhile, in the left direction switching valve 31, since the operating amount of the left travel operation device 3 is smaller, the shifting amount of the spool is smaller, accordingly. Although the ports 31p and 31r communicate with each other, the degree of communication between the ports 31p and 31r is smaller. For these reasons, the supply flow rate to the left pressure compensation valve 32, i.e., to the second compensation port 31r, is less than the supply flow rate on the right side.

In the left direction switching valve 31, the degree of communication between the second compensation port 31r and the communication port 31c is also smaller. For this reason, although the downstream side of the left pressure compensation valve 32 communicates with the downstream side of the right pressure compensation valve 42 via the communication line 50, the degree of communication is restricted compared to the case of straight travel. Therefore, the load pressure difference or rotation speed difference between the left and right travel motors 11 and 12 is not easily offset compared to the case of straight travel. This makes it possible for the construction machine to keep a state where the rotation speed of the left travel motor 11 is lower than the rotation speed of the right travel motor 12. That is, the construction machine can perform a left gradual turn during forward travel. The same applies to a right gradual turn during forward travel, a left gradual turn during backward travel, and a right gradual turn during backward travel.

In the case of performing a forward left pivot turn, the operator fully operates the right travel operation device 4 in the first operating direction, but does not operate the left travel operation device 3. The right direction switching valve 41 behaves in the same manner as in the above-described case of straight travel. The spool of the left direction switching valve 31 remains at the neutral position. As a result, the tank port 31t communicates with the supply/discharge ports 31a and 31b, and the other ports 31p, 31q, 31r, and 31c are blocked. The right travel motor 12 is supplied with a high flow rate and rotates, whereas the left travel motor 11 stops. Accordingly, the construction machine can perform a forward left pivot turn about the stopped left crawler. Since the communication port 31c is blocked, the downstream side of the right pressure compensation valve 42, which is the rotating side, is blocked from the downstream side of the left pressure compensation valve 32, which is the stopped side. The hydraulic oil that has passed through the right pressure compensation valve 42 cannot pass through the left direction switching valve 31. This makes it possible to suppress the occurrence of an ineffective flow. The same applies to a forward right pivot turn, a backward left pivot turn, and a backward right pivot turn.

In the case of performing a forward left super pivot turn, the operator fully operates the left travel operation device 3 in the second operating direction, and fully operates the right travel operation device 4 in the first operating direction. Each of the left direction switching valve 31 and the right direction switching valve 41 behaves roughly in the same manner as in the above-described case of straight travel. However, in the left direction switching valve 31, the spool shifts in the second shifting direction, whereas in the right direction switching valve 41, the spool shifts in the first shifting direction. Although roughly equal high flow rates are supplied to the left and right travel motors 11 and 12, respectively, the left and right travel motors 11 and 12 rotate in opposite directions to each other. Even if a load pressure difference occurs between the left and right travel motors 11 and 12, the load pressure difference can be corrected. Thus, the load pressures of the travel motors 11 and 12 are leveled out, and consequently, the rotation speeds of the travel motors 11 and 12 are leveled out. Therefore, the construction machine can perform a super pivot turn without moving greatly from the spot. The same applies to a forward right super pivot turn, a backward left super pivot turn, and a backward right super pivot turn.

As described above, according to the present embodiment, both straight travel performance and turning travel performance can be secured. Such a functional advantage is realized by adopting a configuration in which the direction switching valves 31 and 41, which conventionally exist, are provided with the communication ports 31c and 41c, respectively, and the degree of communication between the second compensation port 31r and the communication port 31c and the degree of communication between the second compensation port 41r and the communication port 41c are each changed in accordance with the shifting amount of the corresponding spool. In this configuration, the number of valves and the number of oil passages are made as less as possible, which makes it possible to simplify the configuration of the hydraulic circuit 10.

Although the embodiment of the present invention has been described as above, the above-described configurations can be modified as necessary within the scope of the present invention. For example, the above embodiment adopts the aforementioned configuration, in which: "the direction switching valves 31 and 41 . . . are provided with the communication ports 31c and 41c, respectively, and the degree of communication between the second compensation port 31r and the communication port 31c and the degree of communication between the second compensation port 41r and the communication port 41c are each changed in accordance with the shifting amount of the corresponding spool". However, an alternative configuration may be adopted, which is provided with a communication line that allows the second compensation ports 31r and 41r of the left and right direction switching valve 31 and 41 to communicate with each other when the left and right travel operation devices 3 and 4 are operated, and the communication line may be provided with a communication degree adjuster that adjusts the fluidic connection between the left and right travel motors 11 and 12 in accordance with the operating amounts of the respective travel operation devices 3 and 4.

REFERENCE SIGNS LIST 3, 4 travel operation device
10 hydraulic circuit
11, 12 travel motor
13 pump
31, 41 direction switching valve
31p, 41p pump port
31q, 41q first compensation port
31r, 41r second compensation port
31a, 31b, 41a, 41b supply/discharge port
31c, 41c communication port
32, 42 pressure compensation valve
50 communication line

The invention claimed is:
1. A hydraulic circuit of a construction machine, comprising:
  a pump;
  left and right travel motors provided as a left travel motor and a right travel motor of the construction machine;
  left and right pressure compensation valves corresponding to the respective left and right travel motors;
  left and right travel operation devices corresponding to the respective left and right travel motors; and
  left and right direction switching valves corresponding to the respective left and right travel motors, the respective left and right pressure compensation valves, and the respective left and right travel operation devices, the left and right direction switching valves each changing a position of a spool thereof in accordance with an operating amount of the corresponding travel operation device, wherein
  each direction switching valve includes:
    a pump port connected to the pump;
    a first compensation port connected to an upstream side of the corresponding pressure compensation valve;
    a second compensation port connected to a downstream side of the corresponding pressure compensation valve; and
    a pair of supply/discharge ports connected to the corresponding travel motor,
  the hydraulic circuit further comprises a communication line that allows the second compensation ports of the respective left and right direction switching valves to communicate with each other when the left and right travel operation devices are operated, and
  a degree of communication of the communication line is changed in accordance with operating amounts of the respective left and right travel operation devices.

2. The hydraulic circuit of a construction machine according to claim 1, wherein
  the communication line that allows the second compensation ports to communicate with each other is blocked when each travel operation device is in a non-operated state and the spool is at the neutral position.

3. The hydraulic circuit of a construction machine according to claim 1, wherein the communication line allows bidirectional flow between the second compensation ports of the respective left and right direction switching valves.

4. A hydraulic circuit of a construction machine, comprising:
  a pump;
  left and right travel motors provided as a left travel motor and a right travel motor of the construction machine;
  left and right pressure compensation valves corresponding to the respective left and right travel motors;
  left and right travel operation devices corresponding to the respective left and right travel motors; and
  left and right direction switching valves corresponding to the respective left and right travel motors, the respective left and right pressure compensation valves, and the respective left and right travel operation devices, the left and right direction switching valves each changing a position of a spool thereof in accordance with an operating amount of the corresponding travel operation device, wherein
  each direction switching valve includes:
    a pump port connected to the pump;
    a first compensation port connected to an upstream side of the corresponding pressure compensation valve;
    a second compensation port connected to a downstream side of the corresponding pressure compensation valve;
    a pair of supply/discharge ports connected to the corresponding travel motor; and
    a communication port,
  the communication ports of the respective left and right direction switching valves are connected to each other via a communication line, when the spool of each direction switching valve shifts from a neutral position as a result of the corresponding travel operation device being operated, the pump port communicates with the first compensation port and the second compensation port communicates with one of the supply/discharge ports and the communication port, and each direction switching valve is configured such that a degree of communication between the second compensation port and the communication port increases in accordance with increase in a shifting amount of the spool from the neutral position.

5. The hydraulic circuit of a construction machine according to claim 4, wherein the communication port of each direction switching valve is blocked when the corresponding travel operation device is in a non-operated state and the spool is at the neutral position.

6. The hydraulic circuit of a construction machine according to claim 4, wherein communication line allows bidirectional flow between the communication ports of the respective left and right direction switching valves.

* * * * *